(12) United States Patent
Zhao et al.

(10) Patent No.: US 12,332,095 B2
(45) Date of Patent: Jun. 17, 2025

(54) HIGH-DETECTION ACCURACY DIFFERENTIAL FLOWMETER CAPABLE OF BEING REPEATEDLY DISINFECTED

(71) Applicant: GUANGZHOU LANSWICK MEDICAL TECHNOLOGY CO., LTD., Guangdong (CN)

(72) Inventors: Longchao Zhao, Guangdong (CN); Caixin Sun, Guangdong (CN); Hui Dong, Guangdong (CN)

(73) Assignee: GUANGZHOU LANSWICK MEDICAL TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/031,876

(22) PCT Filed: Jul. 19, 2022

(86) PCT No.: PCT/CN2022/106345
§ 371 (c)(1),
(2) Date: Apr. 13, 2023

(87) PCT Pub. No.: WO2023/115923
PCT Pub. Date: Jun. 29, 2023

(65) Prior Publication Data
US 2024/0369394 A1    Nov. 7, 2024

(30) Foreign Application Priority Data
Dec. 24, 2021   (CN) .......................... 20111596328.0

(51) Int. Cl.
*G01F 1/40* (2006.01)
*G01F 1/34* (2006.01)
*G01F 1/36* (2006.01)
*G01F 1/42* (2006.01)

(52) U.S. Cl.
CPC .................. *G01F 1/40* (2013.01); *G01F 1/34* (2013.01); *G01F 1/36* (2013.01); *G01F 1/42* (2013.01)

(58) Field of Classification Search
CPC ..... G01F 1/34; G01F 1/36; G01F 1/40; G01F 1/42; G01F 15/12
See application file for complete search history.

(56) References Cited

U.S. PATENT DOCUMENTS

2011/0138929 A1*  6/2011  Young ....................... G01F 1/40
                                                          73/861.42

FOREIGN PATENT DOCUMENTS

CN         205280157 U  *  6/2016

\* cited by examiner

*Primary Examiner* — Paul M. West

(57) ABSTRACT

A high-detection accuracy differential pressure flowmeter capable of being repeatedly disinfected, includes: a body and a processing module; wherein the body is connected to a gas pipeline, and a antihypertensive component is provided in the body. When the air flows through the body, it will enter from the first air inlet and enter through the first interface to the processing module. The air pressure is detected by the upstream gas. After the air flow passes through the antihypertensive components in the body to reduce the pressure, it will enter from the second air inlet. The structure of the flow meter is passive, simple, disinfection and low cost, and can ensure that there is the same detection accuracy as the new product after disinfection

5 Claims, 16 Drawing Sheets

HIGH-DETECTION ACCURACY DIFFERENTIAL FLOWMETER CAPABLE OF BEING REPEATEDLY DISINFECTED

BACKGROUND OF THE PRESENT INVENTION

Field of Invention

The present invention relates to the technical field of flowmeters, and more particularly to a high detection accuracy differential pressure flowmeter capable of being disinfected repeatedly.

Description of Related Arts

The current flow meters on the market are usually hotline, or thermal film, anemometer, screen pneumotacography, ultrasonic flowmeter and other active devices. When applied to the flow of proximal patient, the patient will contaminate the device. If being used at one time, the cost is high. If it is disinfected, damages are caused to the electronic device due to the presence of electronic devices. The main structure of the plate hole flow meter is passive. Manufacturing costs are lower than the first three. However, the plate holes in the structure are made of flexible materials. If disinfected, the material will be deformed or difficult to remove materials attached to the board holes. The substance remains on the plate hole, which will affect its deformation, which will affect the detection accuracy. In addition, because the plate hole is made of flexible material, when the high flow gas flows through, the plate hole shakes and the measurement accuracy decreases. Therefore, it is necessary to propose a high-detection accuracy differential pressure flowmeter capable of being repeatedly disinfected to solve the problems existing in the existing technology at least in part.

SUMMARY OF THE PRESENT INVENTION

A series of simplified concepts are introduced in the content section of the invention, which will be further explained in the specific embodiment section. The content of the invention does not mean that it is trying to limit the key and necessary technical features of the required protection, nor does it mean to try to determine the scope of protection of the required technology.

In order to solve the above problems at least in part, the present invention provides a high-detection accuracy differential pressure flow meter capable of being repeatedly disinfected, comprising: a body and a processing module; wherein the body is connected to a gas pipeline, and the body is provided with an antihypertensive component, and two ends of the antihypertensive component are provided with a first air inlet and a second air inlet respectively; the first air inlet is connected and communicated with the processing module through a first interface, and the second air inlet is connected and communicated with the processing module through a second interface, and both the first interface and the second interface are provided on the body.

Preferably, the antihypertensive component further comprises at least one group of bidirectional decompression components; each group of the two-way decompression components comprise two decompression devices, and two of the two-way decompression components in each group are independent and symmetrically set up, and capable of decompressing forward and reverse air flow on the gas pipeline.

Preferably, an amount of the two-way decompression components is one group, and two of the decompression devices are set on an inner wall of the body, and the air flow is circulated only through two of the decompression devices.

Preferably, a group amount of the two-way decompression components is one, and an airflow channel is provided between the inner wall of the body and the two decompression devices, wherein the airflow is circulated from the two decompression devices and the airflow channel.

Preferably, a group amount of the two-way decompression components is one, and the inner wall of the body and the two of the decompression devices are sealed by a partition, and the airflow is only circulated through the two decompression devices.

Preferably, the decompression device comprises a circulation; an outer wall of the circulation is connected to the inner wall of the body, and the circulation is provided with a first airway, a second airway, and a third airway, and a fourth airway; wherein:

the first airway and the fourth airway are connected in a straight way, and the first airway and the fourth airway run through two ends of the circulation;

the second airway is located above the first airway, and an extension direction of the second airway in the circulation is the same as that of the first airway (51), and the second airway is connected to the first airway through the third airway; and the angle between the third airway and the second airway is an acute angle, and a circulation direction of the third airway is different from the gas circulation direction in the first airway.

Preferably, the two decompression devices of the two-way decompression components in each group are connected by the outer wall of the circulation, and a port of the first airway on one of the decompression devices and a port of the second airway are on an identical side with a port of the fourth airway on another of the decompression devices.

Preferably, the fourth airway is provided with a partition component; the partition component comprises an outer tube, an inner tube, a seal, and several speed-down components; wherein a first end of the outer tube is connected to an end of the fourth airway, a diameter of a port of a second end of the outer tube is smaller than a diameter of the outer tube, and the inner tube is fixed to an inside of the outer tube by the speed reduction component, and the seal is provided in the inner tube, one end of the inner tube is a sealed end, and the sealing end is located on a side far from where the outer tube and the fourth airway are connected, and several pores are provided on the seal end.

Preferably, the seal is in a shape of a sphere, and several exhaust ports are provided on a side wall of the inner tube, the stomatal and the exhaust port are located on two sides of the speed reduction component, a dimensions of the seals are less than an inner diameter of the inner tube and greater than an inner diameter where the outer tube and the fourth airway are connected.

Preferably, the speed reduction component is set in a circular manner on the outer wall of the inner tube, the speed reduction component is V-shaped, and there is a gap between two adjacent descent components located on the same radial plane.

Compared with the existing technology, the present invention includes at least the following beneficial effects:

1. The high-detection high-accuracy differential pressure flowmeter of the invention can be repeatedly disinfected. When the air flow passes through the body, it will enter from the first air inlet and enter through the first interface to the processing module. The air pressure is detected by the upstream gas. Reach the processing module to detect the pressure of the downstream gas, and integrate it with the pressure of the upstream gas to calculate the flow rate of the gas. The flowmeter uses a antihypertensive component to reduce the structure to simplify the structure, thereby reducing the production cost. The processing module can be disassembled when disinfecting outside the body, thereby preventing damage to the electronic components, and thus the original result. The structure of the flow meter is passive, simple, disinfection and low cost, and can ensure that it has the same detection accuracy as the new product after disinfection.

The other advantages, goals, and characteristics of the present invention can be partially reflected by the following explanations, and some will be understood by those skilled in the art through the following explanations, and some will be understood by those skilled in the art through the research and practice of the present invention.

BRIEF DESCRIPTION OF THE DRAWINGS

The drawings are used to provide a further understanding of the invention, and forms a part of the specification, which is used to interpret the invention together with the embodiments of the present invention, and does not constitute a limitation on the invention.

In the Figures.

Figure 1:
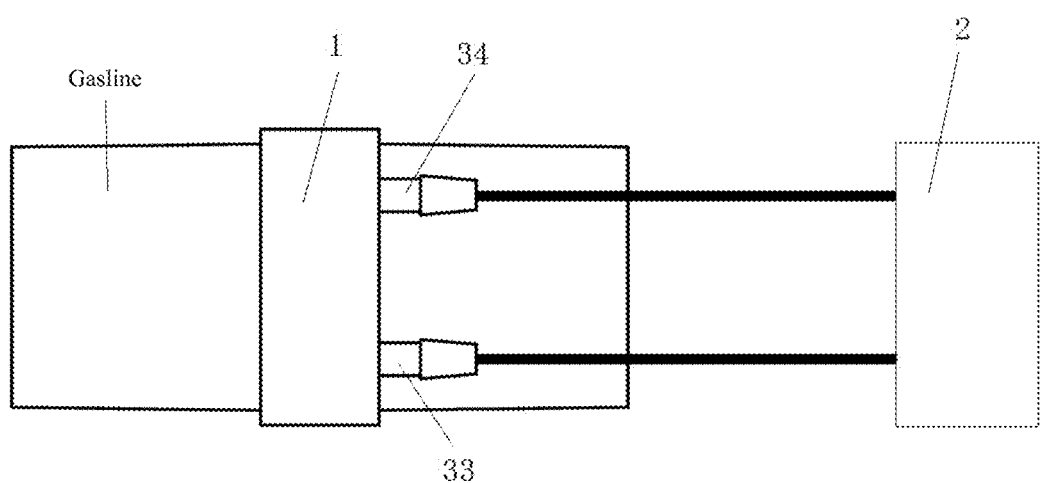
FIG. 1 is a top view of the high-detection high-accuracy differential pressure flow meter described in the present invention.
Figure 2:
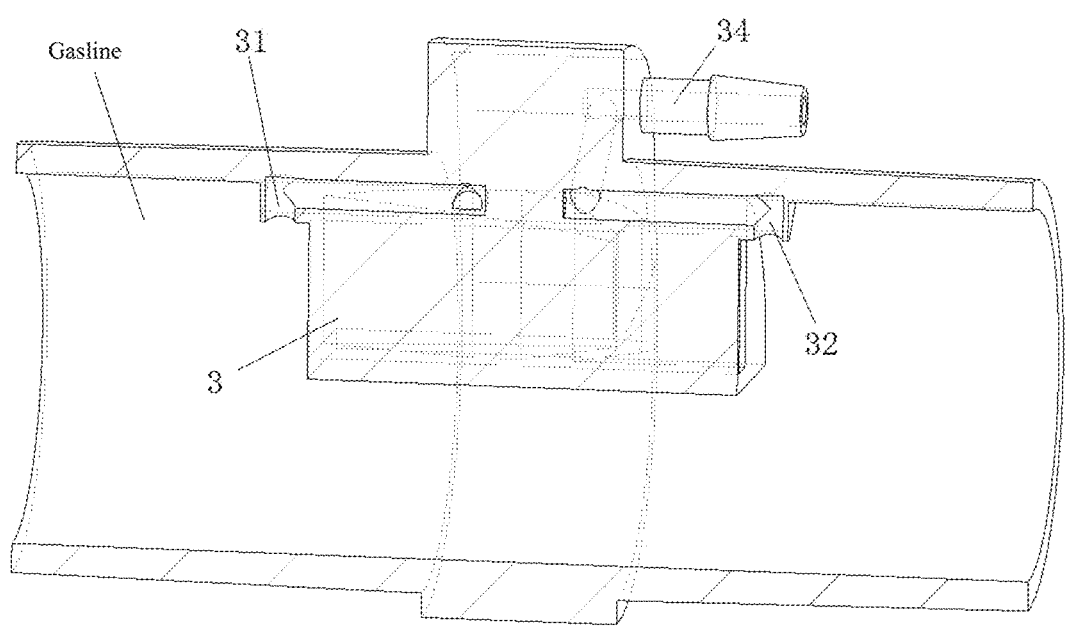
FIG. 2 is a schematic diagram of the profile of the repeatedly disinfected high-detection accuracy differential pressure flow meter described in the present invention.
Figure 3:
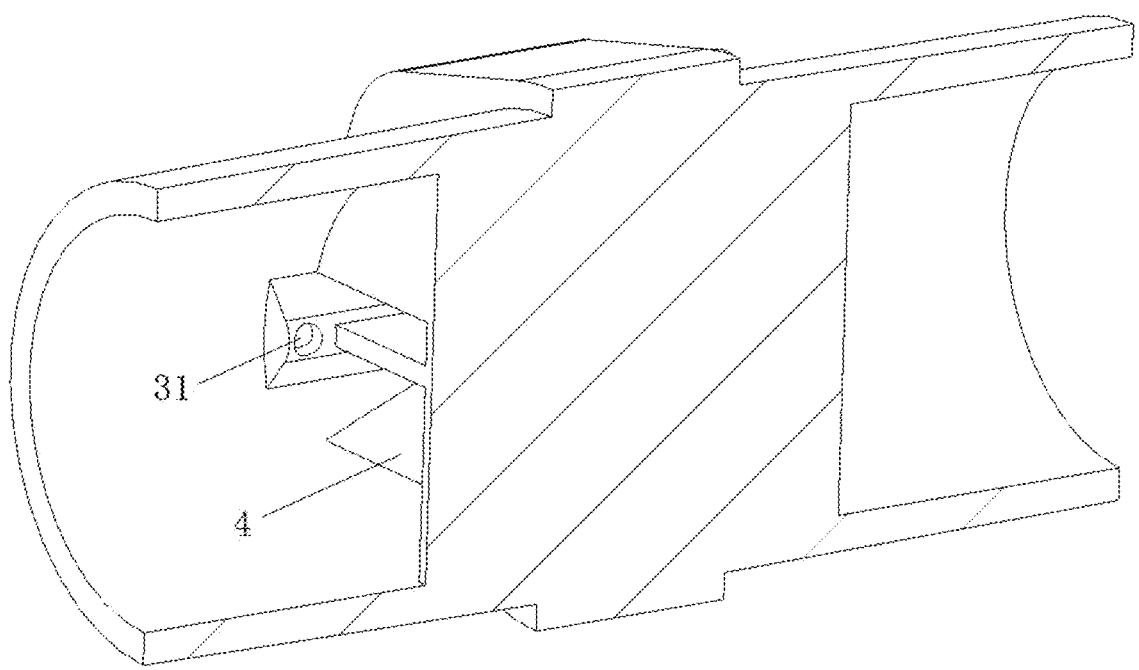
FIG. 3 is a schematic diagram of the section structure of the reciprocating view of the high-detection high-detection accuracy differential pressure flow meter described in the present invention.
Figure 4:
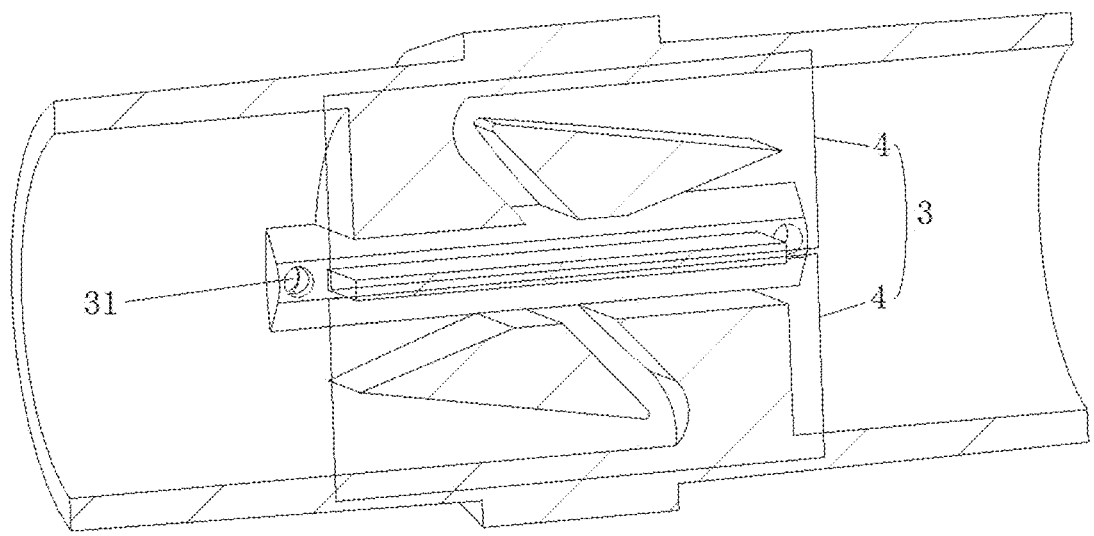
FIG. 4 is a schematic diagram of the section structure at the descending view of the hypotensive component of the high-detection high-detection accuracy pressure differential flow meter described in the present invention.
Figure 5:
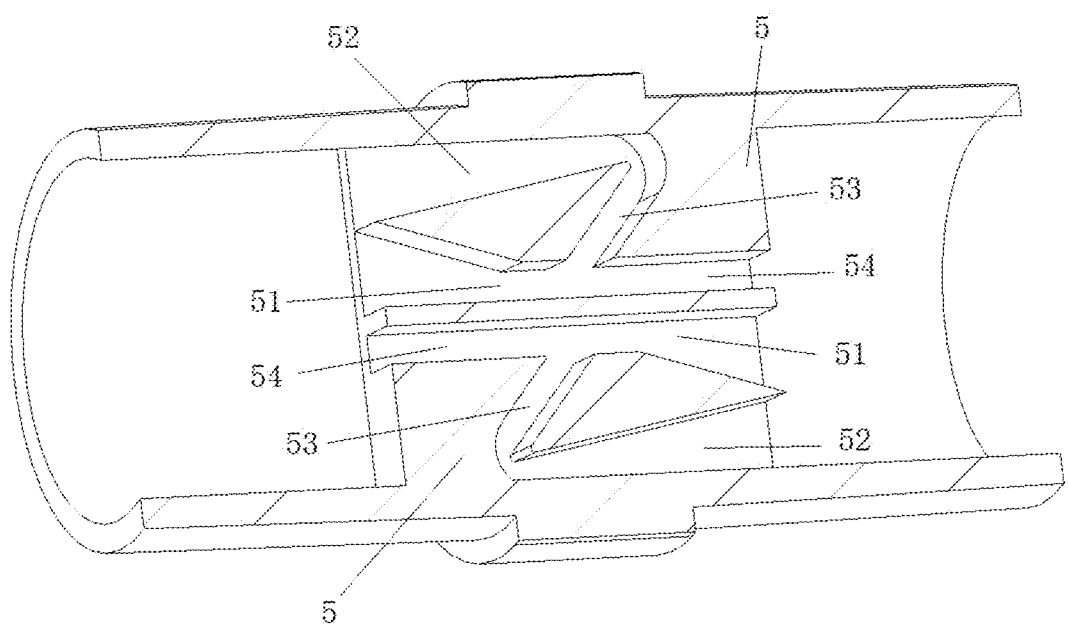
FIG. 5 is a schematic diagram of the section structure of the subtractal component of the subtractal component of the subtractable component of the high-detection high-detection accuracy and pressure differential flow meter described in the present invention.
Figure 6:
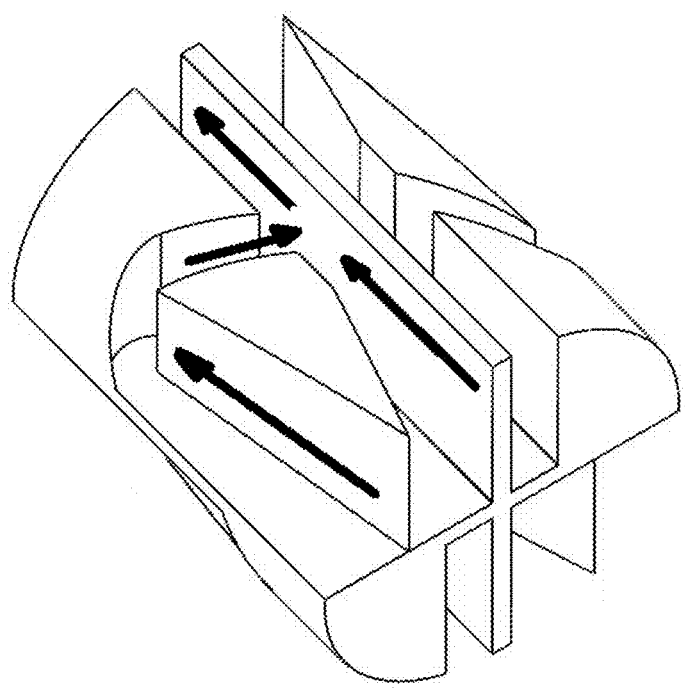
FIG. 6 is a schematic diagram of the gas circulation of the decompression device in the high-detection high-detection accuracy differential pressure flow meter described in the present invention.
Figure 7:
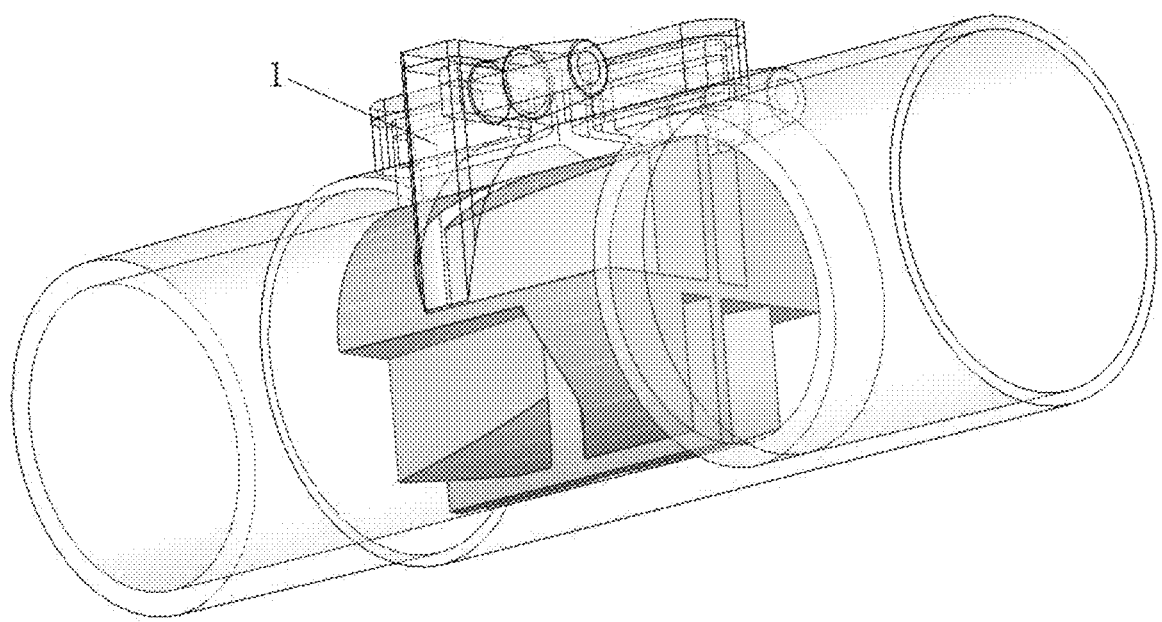
FIG. 7 is a schematic diagram of the body of the body of the repeatedly disinfected high detection accuracy and pressure differential flow meter described in the present invention.
Figure 8A:
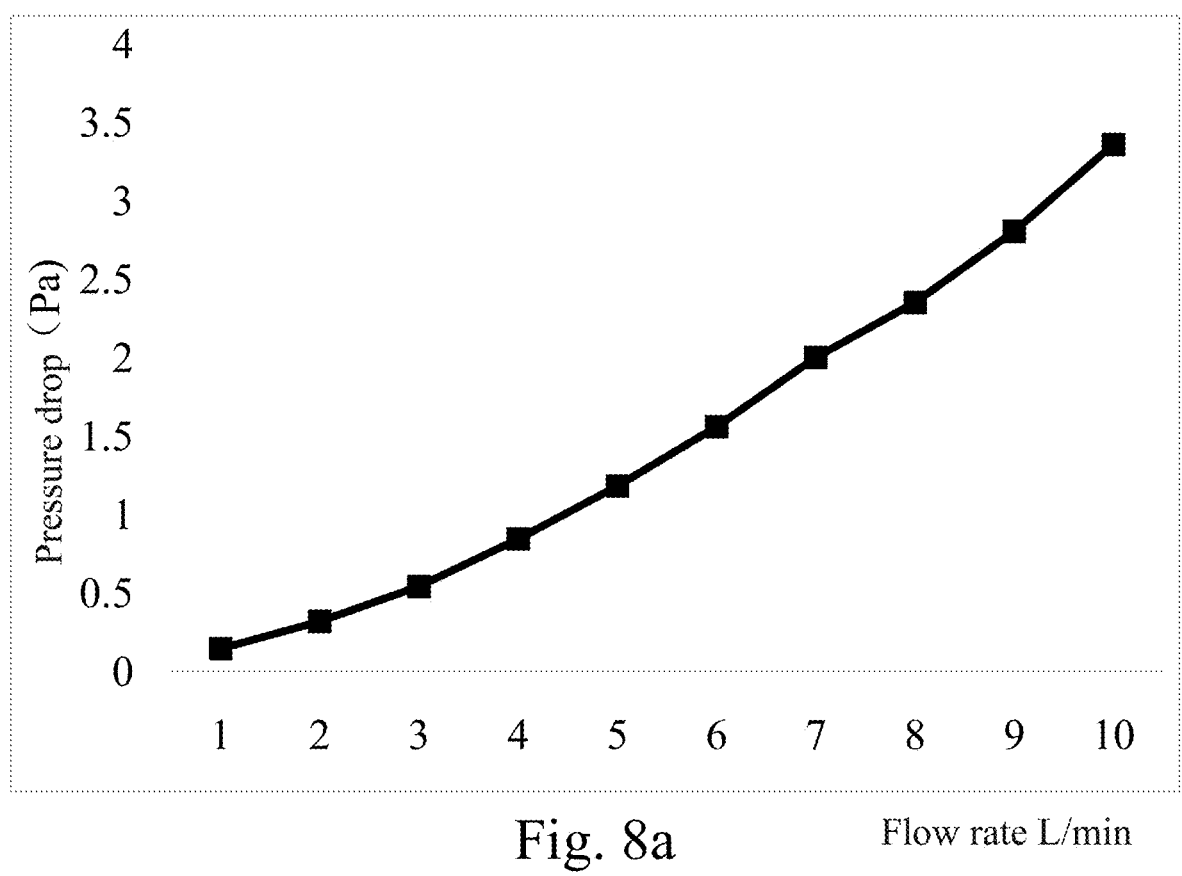
FIGS. 8A, 8B, and 8C are the pressure differences and flow diagrams of high-detection high-detection accuracy and pressure differential flowmeter described in the present invention.
Figure 8B:
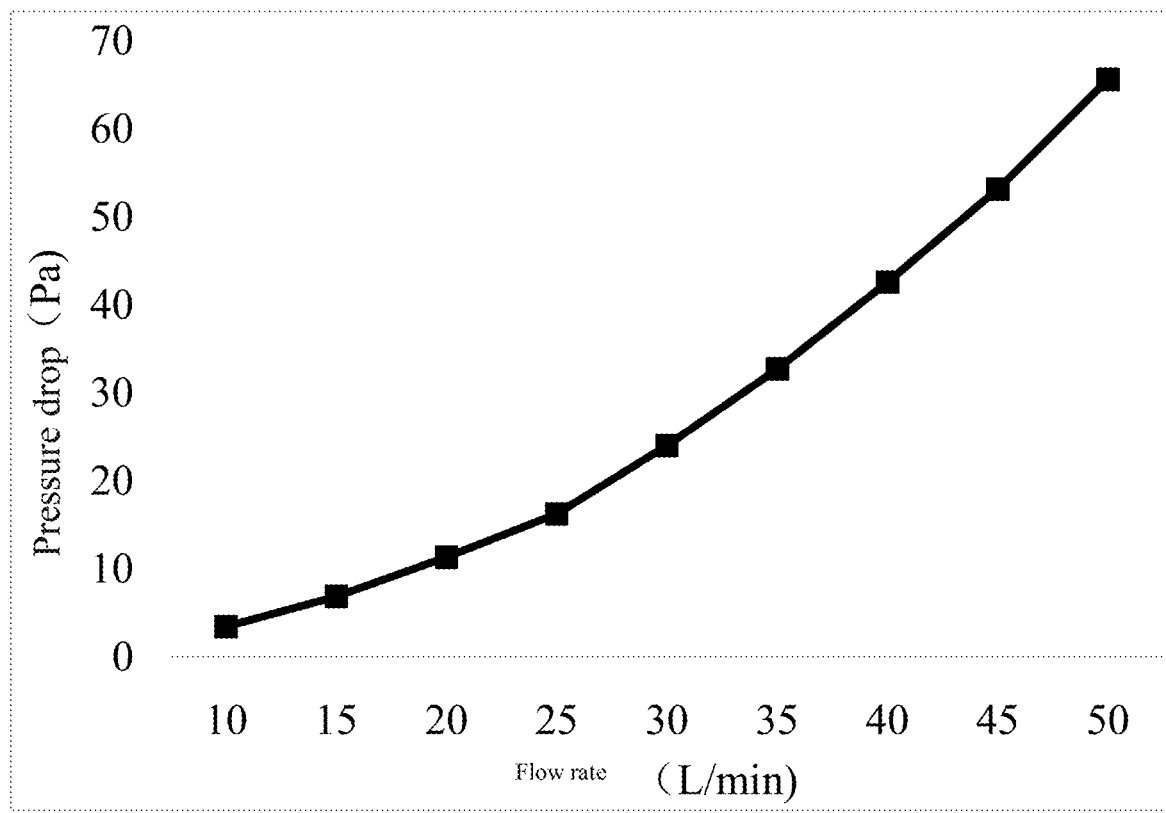
Figure 8C:
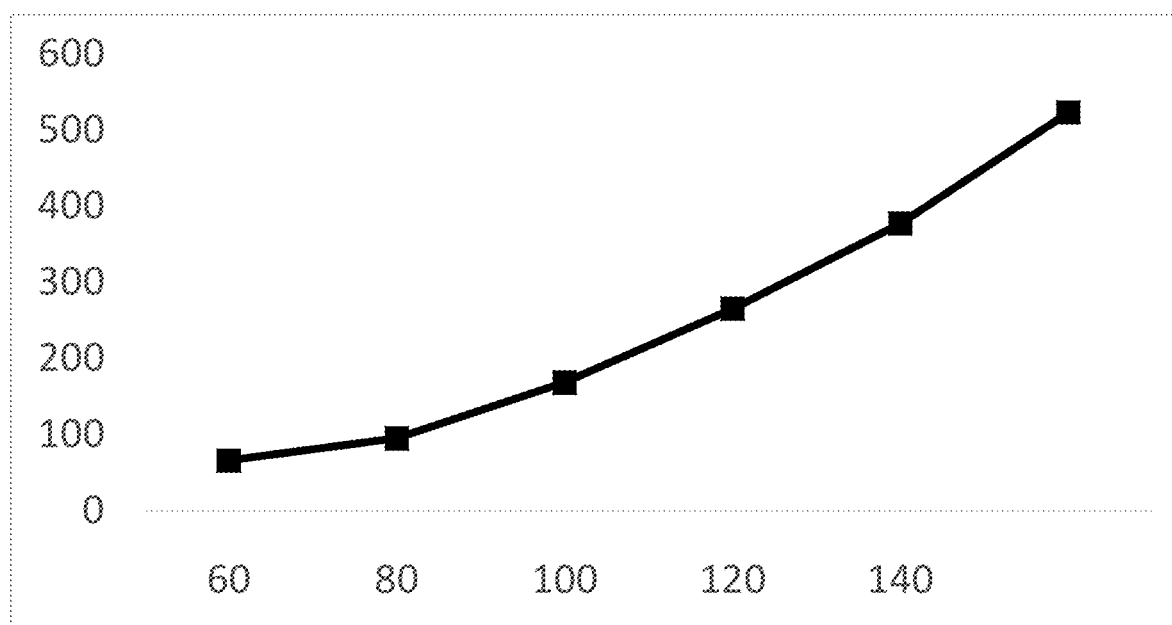
Figure 9:
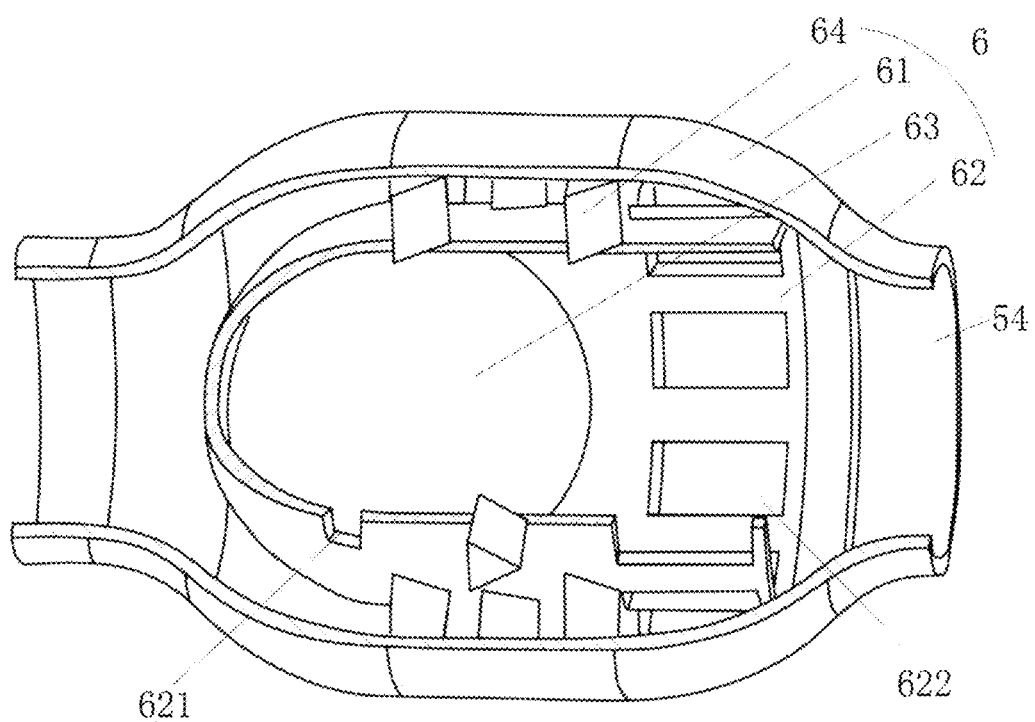
FIG. 9 is a schematic diagram of the section structure of the partition component of the repeatedly disinfected high detection accuracy and differential pressure flow meter described in the present invention.

In the FIGS.: 1-body, 2-processing module, 3-antihypertensive components, 31-first air inlet, 32-second air inlet, 33-first interface, 34-second interface, 4-decompression device, 5-circulation part, 51-first airway, 52-second airway, 53-third airway, 54-fourth airway, 6-partition component, 61-outer tube, 62-inner tube, 621-air hole, 622-exhaust gas mouth, 63-seals, 64-speed reduction components.

DETAILED DESCRIPTION OF THE PREFERRED EMBODIMENT

The following is a detailed description of the present invention in combination with the drawings and examples so that those skilled in the art can implement it according to the text.

It should be understood that the terms such as "possession", "inclusion" and "including" used herein do not exclude the existence or addition of one or more other components or combinations thereof.

As shown in FIGS. 1-14, the present invention provides a high-detection accuracy differential pressure flowmeter that can be repeatedly disinfected, including: ontology 1 and processing module 2; the ontology 1 is connected to the gas pipeline, and the underlying pressure component 3 is provided in the body 1, and the two ends of the antihypertensive component 3 are provided with the first air inlet 31 and the second air inlet 32, which are respectively provided with the first air inlet 32 and the second air inlet 32, which are respectively provided 31 is connected and connected to the processing module 2 through the first interface 33, and the second inlet 32 is connected and connected to the processing module 2 through the second interface 34, and the first interface 33 and the second interface 34 are set on the body 1.

The working principle and beneficial effect of the above technical solution: Through the design of the above structure, when the airflow passes through the body 1, it will enter from the first air inlet 31 and enter the processing module through the first interface 33 to the processing module 2. After the air pressure is reduced from the second air inlet 32, the airflow will be entered from the second air inlet 32, and through the second interface 34 to the processing module 2 to the downstream gas. The air pressure is detected and integrated with the upstream gas pressure. The gas flow rate is calculated by the pressure difference. This flow meter uses a step-down component 3 to reduce the structure, which can simplify the structure, thereby reducing the production cost. The processing module 2 can be disassembled during disinfection outside the body 1, thereby preventing damage to the electronic components, and then the structure of the flow meter is passive. Simple, disinfection and low cost, and can ensure the same detection accuracy as the new product after disinfection.

In one embodiment, the antihypertensive component 3 further comprises several groups of bidirectional decompression components; each of the two-way decompression components includes two decompression devices 4, and two of the two-way decompression components in each group are independent and symmetrically set up to decompress the forward and reverse airflow on the gas pipeline.

The working principle and beneficial effect of the above technical solution: Through the design of the above structure, the antihypertensive component 3 includes several groups of two-way decompression components, so that when replacing the airflow direction in the gas pipeline, it is not necessary to change the position of the body 1, so that the flow meter does not need to consider the direction problem during installation. After the airflow direction is changed, the airflow enters the upstream gas from the second air inlet 32, the upstream gas, the upstream gas, the upstream gas, the upstream gas, the upstream gas, the upstream gas, the upstream gas, the upstream gas, the upstream gas, the upstream gas, the upstream gas, the upstream gas, and the airflow. The entry from the first air inlet 31 is changed to the downstream gas. For the processing module 2, the measurement result is not affected. In order to ensure that there is a sufficiently large pressure difference before and after the antihypertensive component 3, multiple groups of bidirectional decompression components can be used to decompress. Two decompression devices in each two-way decompression component 4 are independent of each other and are set up in the body 1.

In one embodiment, the two-way decompression components are a group and two of the decompression devices 4 are set on the inner wall of the body 1, and the airflow can only flow through two of the decompression devices 4. And the inner wall of the body 1 and the two decompression devices 4 are sealed by a partition.

The working principle and beneficial effects of the above technical solutions: In this embodiment, a set of two-way decompression components is set as an example. Two decompression devices 4 can be symmetrically set on the inner wall of the body 1 and fill the entire body 1, so that the airflow must pass through the pressure reducing device 4 to circulate, or a partition between the inner wall of the two decompression devices 4 and the body 1 is used to guide the airflow from the decompression device 4 from the decompression device 4 Circulation, because the airflow can only be circulated through the decompression device 4, so it can improve the decompression efficiency of the airflow, so that the pressure difference can be increased, and the pressure difference can be increased while accelerating the flow rate of the downstream airflow.

In one embodiment, the two-way decompression component is a group, and an air flow channel is left between the inner wall of the body 1 and two of the decompression devices 4, and the airflow may be circulated from two of the decompression device 4 and the airflow channel.

The working principle and beneficial effect of the above technical solution: In this embodiment, taking only one set of two-way decompression components as an example, the decompression device 4 will reduce the circulation area in the body 1, so some airflow will flow from the decompression device 4 for decompression, and the other part will flow through the air channel between the body 1 and the decompression device 4, which can achieve decompression without increasing the speed of the airflow. As a result, there will be no block when the air flow is flowing as a whole, and the patient will not feel a sense of exhalation when it is used for ventilator.

In one embodiment, the decompression device 4 includes a circulation part 5; the outer wall of the circulation 5 is connected to the inner wall of the body 1, and the first airway 51, the second airway 52, the third airway 53, and the fourth airway 54 are provided within the circulation 5; wherein:

the first airway 51 and the fourth airway 54 are connected to a straight line type, and the airway 51 and the fourth airway 54 run through the two ends of the circulation 5;

the second airway 52 is located above the first airway 51, and the extension direction of the second airway 52 in the circulation 5 is the same as that of the first airway 51, and the second airway 52 passes through the third airway 53 and the first airway 53 and 51 are connected;

the angle between the third airway 53 and the second airway 52 is an acute angle, and the circulation direction of the gas in the third airway 53 is different from that of the gas circulation direction in the first airway 51; two of the two of the two-way decompression components described in each group are connected by the outer wall of the circulation 5, and the port of the first airway 51 on one of the decompression device 4 and the port of the second airway 52 are located on the same side as the port of the fourth airway 54 on another decompression device 4.

The working principle of the above technical solution: Take the direction of gas flow in FIG. 6 as an example. When the airflow reaches the circulation part 5, it will enter from the first airway 51 and the second airway 52, respectively. When the airflow in the second airway 52 reaches the third airway 53, the airflow direction will be changed, so that the airflow direction from the third airway 53 to the first airway 51 and the airflow direction in the first airway 51 will be changed. In contrast, the airflow with the opposite direction collides at the intersection of the first airway 51 and the third airway 53, so that the confluence airflow velocity is smaller than the airflow velocity in the first airway 51, and then the confluence airflow will run through the fourth airway 54 to the other side of the circulation part 5.

Another decompression device in the same group of two-way decompression components in the same group of two-way decompression devices in the same group 4 will accelerate the airflow. Because another decompression device is set up symmetrically, the airflow will enter from the fourth airway 54, and then a small part of the airflow will be diverted to the third airway 53 and flow out from the second airway 52. Most of it will flow from the first airway 51. Because the circulation area of the airflow will decrease, the airflow speed of the fourth airway 54 will be accelerated. The second airway 51 will be accelerated. The outflow airflow is consistent with the outflow airflow direction of the first airway 51, so the outflow from the first airway 51 will accelerate the outflow from the second airway 52, and then the negative pressure in the second airway 52 will introduce more airflow from the third airway 53 and then the airflow velocity from the first airway 51 and the second airway 52 will be greater than the airflow velocity at the entrance end.

The beneficial effects of the above technical scheme: Through the design of the above structure, one of the decompression devices in the two-way decompression component 4 will decelerate the airflow, so that the airflow at both ends of the body 1 will be different, and the symmetrical decompression device 4 will accelerate the airflow. A pressure difference is formed near the airway 54 than the pressure at the inflow end, which allows the processing module 2 to be calculated by the flow rate.

In one embodiment, the partition component 6 is provided on the fourth airway 54; the partition component 6 includes the outer tube 61, the inner tube 62, the seal 63, and several speed reduction components; one end of the outer tube 61 is connected to the end of the fourth airway 54, and the diameter of the other end of the outer tube 61 is less than the diameter of the port of the other end of the outer tube 61. In diameter of 61, the inner tube 62 is fixed inside the outer tube 61 through the speed reduction component 64, the seal 63 is set within the inner tube 62, one end of the inner tube 62 is the seal end, and the sealing end is located on the side far from the outer tube 61 connected to the fourth airway 54, and Several pores 621 are provided on the sealing end. The seal 63 is spherical, and the side wall of the inner tube 62 is provided with several exhaust ports 622, the stomatal 621 and the exhaust port 622 are located on both sides of the speed reduction component 64, and the size of the seal 63 is less than the inner diameter of the inner tube 62, which is greater than the inner diameter of the inner tube 62, which is greater than the inner diameter of the inner tube 61 and the inner diameter of the fourth airway 54. The speed reduction component 64 is set in a circular shape on the outer wall of the inner tube 62, and the speed reduction component 64 is V-shaped and has a gap between two adjacent descent components located on the same radial plane.

Figure 10:
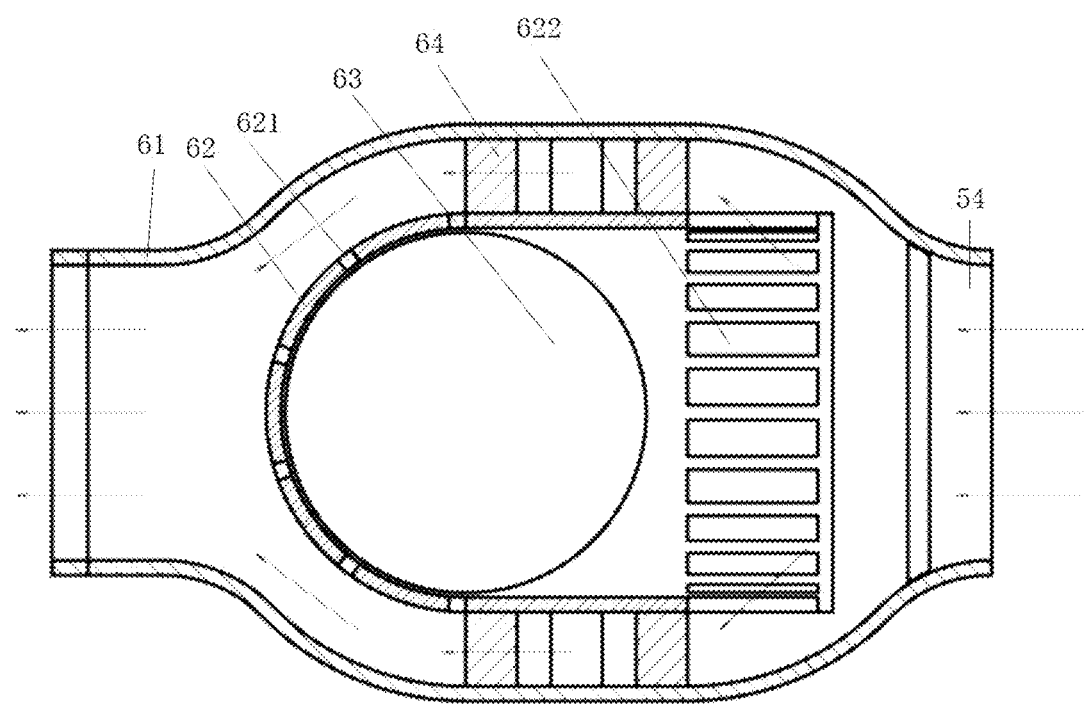
FIG. 10 is a schematic diagram of the airflow of the partition component on one of the decompression devices when an air flow passes.
Figure 11:
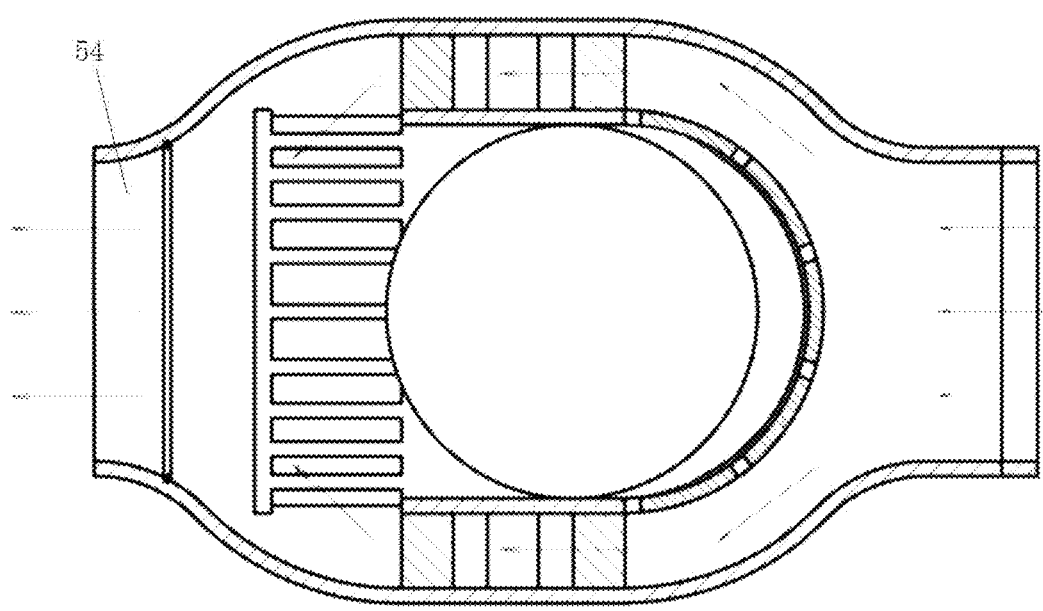
FIG. 11 is a schematic diagram of the airflow of a partition component on a decompression device opposite to FIG. 10 when air flows.
Figure 12:
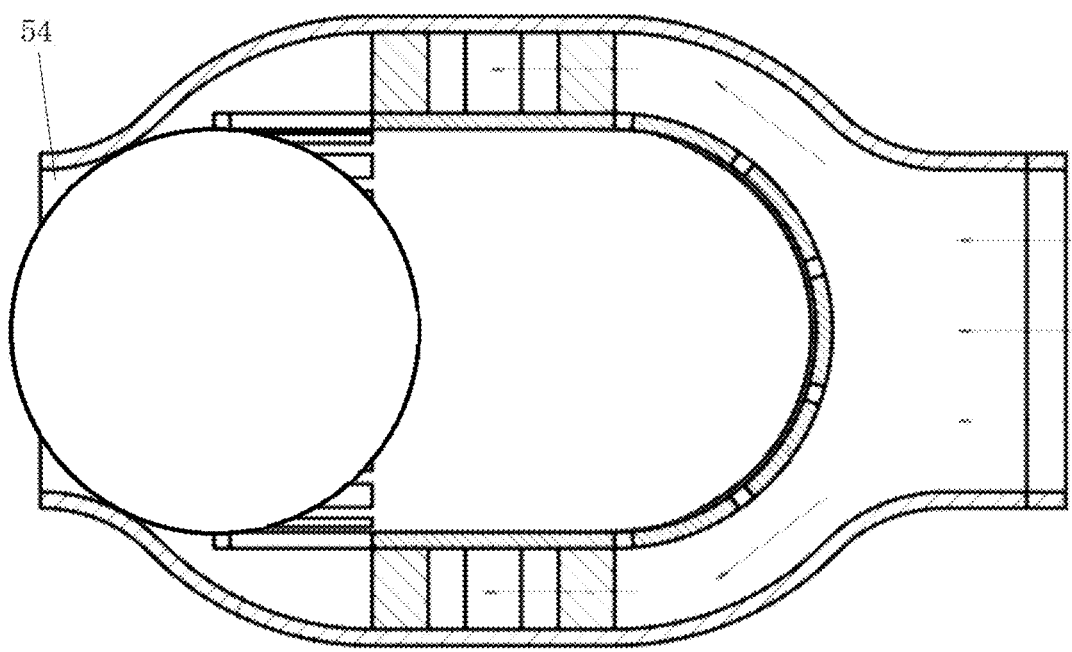
FIG. 12 is a schematic diagram of the airflow of the partition component in FIG. 11 when the air flow through FIG. 11 is large.
Figure 13:
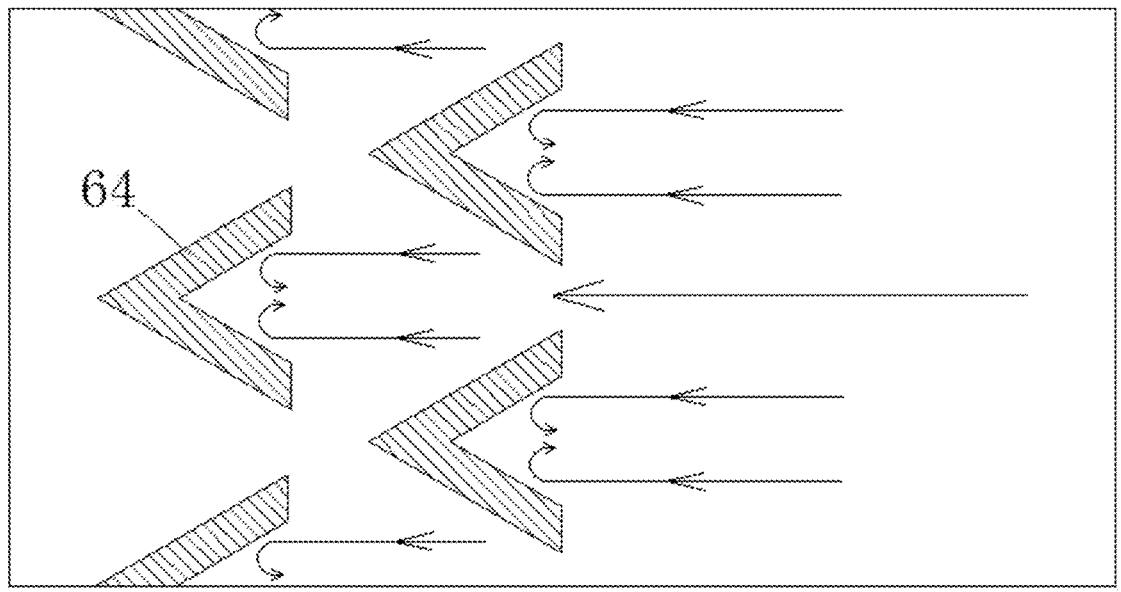
FIG. 13 is a schematic diagram of the airflow of the airflow in FIG. 10 through the speed-down assembly.
Figure 14:
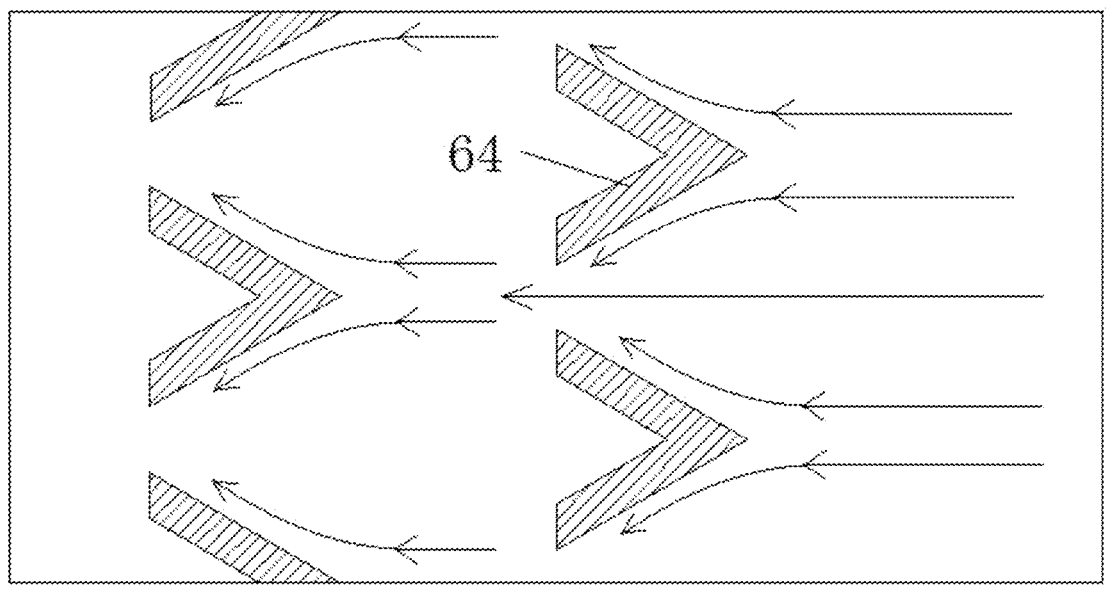
FIG. 14 is a schematic diagram of the air flow of the airflow in FIG. 11.

The working principle and beneficial effects of the above technical scheme: Through the design of the above structure, when the airflow flows from the fourth airway 54, as shown in FIG. 10, the airflow will flow out through the exhaust port 622 on the inner tube 62, and the speed reduction component 64 is used for secondary speed reduction. As shown in FIG. 13, the airflow will rebound on the concave surface that hits the V-shaped, thereby reducing the air velocity, and reducing the air velocity. The airflow can slow down after the deceleration of the decompression device 4; when the air flows from the fourth airway 54, if the airflow rate is large, the seal 63 will be blown to the fourth airway 54 through the stomata 621 at the sealing end, as shown in FIG. 12, so as to avoid the faster airflow being accelerated again, and then avoid the outflow from the first airway 51. High-speed airflow affects the low-speed airflow from another fourth airway 54 to reduce the measurement error value, because if the airflow velocity is too fast, the reduction effect of the pressure reducing device 4 on the airflow is limited. At this time, the accelerated airflow and the decelerated air flow rate are almost the same, resulting in a low pressure difference, and the measurement error will be increased. If the airflow rate is moderate, the seal will be sealed. 63 It will not block the fourth airway 54, and the airflow will not be affected by the speed reduction assembly 64, so that the accelerated air flow can help decelerate airflow to generate a pressure lower than the pressure at the inflow, thereby improving the measurement accuracy.

In one embodiment, the processing module 2 can measure the pressure at the first air inlet 31 and the second air inlet 32 and calculate the flow rate of the air flow through the formula $$Q = \frac{C \varepsilon S_2^2 \sqrt{2 \Delta P \rho}}{\sqrt[4]{1 - \left(\frac{S_2}{S_1}\right)^4}}$$

wherein: Q is the flow rate of the air flow; C is the outflow coefficient; ε is the expandability coefficient; S_1 is the total area of the upstream gas in the two-way decompression component (that is, the sum of the circulation area of the first airway 51, the second airway 52, and the third airway 53); S_2 is the total area of the downstream gas circulating in the two-way decompression module (that is, the fourth airway 54 Circulation area); Δp is the pressure difference between the two ends of the two-way decompression component (that is, the pressure difference measured at the first interface 33 and the second interface 34); ρ is the gas density; when calculating the pressure difference between the two ends of the two-way decompression assembly, ignore the effect of the pressure-accelerating decompression device 4 on the air pressure, and only use the pressure generated by the decelerated airflow as the outflow end. The pressure value can be obtained by formula Δp=p_1−p_2=(8γp (1_1+1_2σ^4) s_2)/s_1+p (1_1/s_1+1_2/s_2)+p (σ^4-1)/2+Δp_damage, where p_1 is the air pressure value at 31 first air inlets (to take the air pressure value at 31 first air inlet (to use it The airflow flows from the first air inlet 31 to the second air inlet 32 as an example); P_2 is the pressure value at the second air inlet 32; γ is the motor viscosity of the airflow; L_1 is the total length of the first airway 51, the second airway 52, and the third airway 53; L_2 is the length of the fourth airway 54; σ is the ratio of the circulation area, that is, s_1/s_2; Δp_ is a local loss of pressure.

The working principle and beneficial effect of the above technical solution: It can be known from the above formula that when calculating the pressure difference, the sum of the airflow viscosity term, inertia term, Bernoulli term, and local gas loss can be obtained, although another decompression device 4 in the same group of two-way decompression components can accelerate the airflow and form a negative pressure at the deceleration end to reduce local loss of air pressure, but in the deceleration end, a negative pressure is formed to reduce local loss of air pressure, but in the deceleration end, a negative pressure is formed to reduce local loss of air pressure, but in the deceleration end, a negative pressure is formed to reduce the local loss of air pressure. In actual applications, the speed of the airflow cannot be directly known, and it can only be known by calculation. Therefore, in order to avoid the situation where the pressure difference is not obvious due to the excessive air flow rate, the negative pressure due to the acceleration of the airflow is directly ignored, and the loss is directly calculated. Therefore, the actual pressure difference between the two ends of the decompression device can be calculated through the above formula, and the calculated pressure difference can be substituted into the Bernoulli equation to calculate the specific airflow. In order to facilitate the calculation and make the bidirectional decompression components not affected by the direction of the airflow, the pressure difference is always used for subsequent calculations. Through the above formula, the processing module 2 can be used to quickly calculate the pressure difference to convert to the flow rate for display. Through the above formula, it can be seen that the flow meter has no special requirements for the decompression device 4 when calculating the flow rate. Therefore, after repeated disinfection, it can be guaranteed that the flowmeter still has a relatively good flow meter. High detection accuracy, and compared to traditional hotline anemometer, Screen pneumotacography, ultrasonic flowmeter, plate hole flow meter, etc. can be suitable for more occasions.

In the description of the present invention, it needs to be understood that the terms "center", "vertical", "horizontal", "length", "width", "thickness", "up", "down", "front", "back", "left", "right", "vertical", "horizontal", "top", "bottom", "inside", "outside", "clockwise", "counterclockwise", "counterclockwise", "counterclockwise", "counterclockwise", "counterclockwise", "counterclockwise", "counterclockwise", The orientation or positional relationship of "axial", "radial", "circumference" and other instructions is based on the orientation or positional relationship shown in the figure, only to facilitate the description of the present invention and simplified description, instead of indicating or implying that the device or component referred to must have a specific orientation and construct and operate with a specific orientation, so it cannot be understood as a restriction on the present invention.

In the present invention, the terms "installation", "connection", "connection", and "fixation" shall be broadly understood unless otherwise specified and defined, for example, it may be a fixed connection, it may be a detachable connection, or it can be a mechanical connection, or it may be an electrical connection or a communication with each other; it can be directly connected, or it can be connected indirectly through an intermediate medium, or two components. Internal connectivity or the interaction between two components, unless there is a clear restriction. For ordinary skilled personnel in the art, the specific meaning of the above term in the present invention can be understood according to the specific situation.

Although the embodiment of the present invention has been published as above, it is not limited to the use listed in the instructions and embodiments. It can be applied to various fields suitable for the invention. For those familiar with the art, it can easily achieve additional modifications. Therefore, under the general concept defined by the claims and equivalent range, the present invention is not limited to specific details and the descriptions shown here.

What is claimed is:

1. A high-detection accuracy differential pressure flow meter capable of being repeatedly disinfected, comprising: a body (1) and a processing module (2); wherein the body (1) is connected to a gas pipeline, and the body (1) is provided with an antihypertensive component (3), and two ends of the antihypertensive component (3) are provided with a first air inlet (31) and a second air inlet (32) respectively; the first air inlet (31) is connected and communicated with the processing module (2) through a first interface (33), and the second air inlet (32) is connected and communicated with the processing module (2) through a second interface (34), and both the first interface (33) and the second interface (34) are provided on the body (1);

wherein the antihypertensive component (3) further comprises at least one group of bidirectional decompression components; each group of the two-way decompression components comprise two decompression devices (4), and two of the two-way decompression components in each group are independent and symmetrically set up, and capable of decompressing forward and reverse air flow on the gas pipeline;

wherein the decompression device (4) comprises a circulation (5); an outer wall of the circulation (5) is connected to the inner wall of the body (1), and the circulation (5) is provided with a first airway (51), a second airway (52), and a third airway (53), and a fourth airway (54); wherein:

the first airway (51) and the fourth airway (54) are connected in a straight way, and the first airway (51) and the fourth airway (54) run through two ends of the circulation (5);

the second airway (52) is located above the first airway (51), and an extension direction of the second airway (52) in the circulation (5) is the same as that of the first airway (51), and the second airway (52) is connected to the first airway (51) through the third airway (53); and the angle between the third airway (53) and the second airway (52) is an acute angle, and a circulation direction of the third airway (53) is different from the gas circulation direction in the first airway (51).

2. The high-detection accuracy differential pressure flow meter capable of being repeatedly disinfected, as recited in claim 1, wherein the two decompression devices (4) of the two-way decompression components in each group are connected by the outer wall of the circulation (5), and a port of the first airway (51) on one of the decompression devices (4) and a port of the second airway (52) are on an identical side with a port of the fourth airway (54) on another of the decompression devices (4).

3. The high-detection accuracy differential pressure flow meter capable of being repeatedly disinfected, as recited in claim 1, wherein the fourth airway (54) is provided with a partition component (6); the partition component (6) comprises an outer tube (61), an inner tube (62), a seal (63), and several speed reduction components (64); wherein a first end of the outer tube (61) is connected to an end of the fourth airway (54), a diameter of a port of a second end of the outer tube (61) is smaller than a diameter of the outer tube (61), and the inner tube (62) is fixed to an inside of the outer tube (61) by the speed reduction component (64), and the seal (63) is provided in the inner tube (62), one end of the inner tube (62) is a sealed end, and the sealing end is located on a side far from where the outer tube (61) and the fourth airway (54) are connected, and several pores (621) are provided on the seal end.

4. The high-detection accuracy differential pressure flow meter capable of being repeatedly disinfected, as recited in claim 3, wherein the seal (63) is in a shape of a sphere, and several exhaust ports (622) are provided on a side wall of the inner tube (62), the several pores (621) and the exhaust port (622) are located on two sides of the speed reduction component (64), a dimensions of the seals (63) are less than an inner diameter of the inner tube (62) and greater than an inner diameter where the outer tube (61) and the fourth airway (54) are connected.

5. The high-detection accuracy differential pressure flow meter capable of being repeatedly disinfected, as recited in claim 3, wherein the speed reduction component (64) is set in a circular manner on the outer wall of the inner tube (62), the speed reduction component (64) is V-shaped, and there is a gap between two adjacent descent components (64) located on the same radial plane.

* * * * *